United States Patent [19]

Schiffer et al.

[11] 4,340,077
[45] Jul. 20, 1982

[54] METHOD OF AND APPARATUS FOR REMOTELY CONTROLLING ORIFICE-OPENING AND ORIFICE-CLOSING OPERATIONS

[75] Inventors: Peter Schiffer, Aachen; Ernst Heinrichs, Wassenberg; Manfred Helten, Titz-Müntz, all of Fed. Rep. of Germany

[73] Assignee: Kernforschungsanlage Jülich GmbH, Jülich, Fed. Rep. of Germany

[21] Appl. No.: 198,130

[22] Filed: Oct. 17, 1980

[30] Foreign Application Priority Data

Oct. 18, 1979 [DE] Fed. Rep. of Germany ....... 2942118

[51] Int. Cl.³ .............................................. F16K 13/04
[52] U.S. Cl. ................................ 137/68 A; 137/637.1; 251/131

[58] Field of Search .......................... 137/68 A, 637.1; 251/131

[56] References Cited

U.S. PATENT DOCUMENTS

| 3,548,848 | 12/1970 | Stichling | 137/68 A |
| 4,095,421 | 6/1978 | Silcox | 137/81.2 X |
| 4,249,563 | 2/1981 | Shaw | 137/637.1 X |

*Primary Examiner*—Harold W. Weakley
*Attorney, Agent, or Firm*—Karl F. Ross

[57] ABSTRACT

A nozzle, e.g. for an air sampler, is opened by remote control by the firing of a squib which breaks loose a silicone-sealing body which is normally pressed by spring force against the nozzle orifice. When the body breaks away, a closing frame swings into position and upon the remotely controlled firing of another squib allows a spring biased closing member to engage with its silicone seal the orifice.

5 Claims, 4 Drawing Figures

U.S. Patent    Jul. 20, 1982    4,340,077
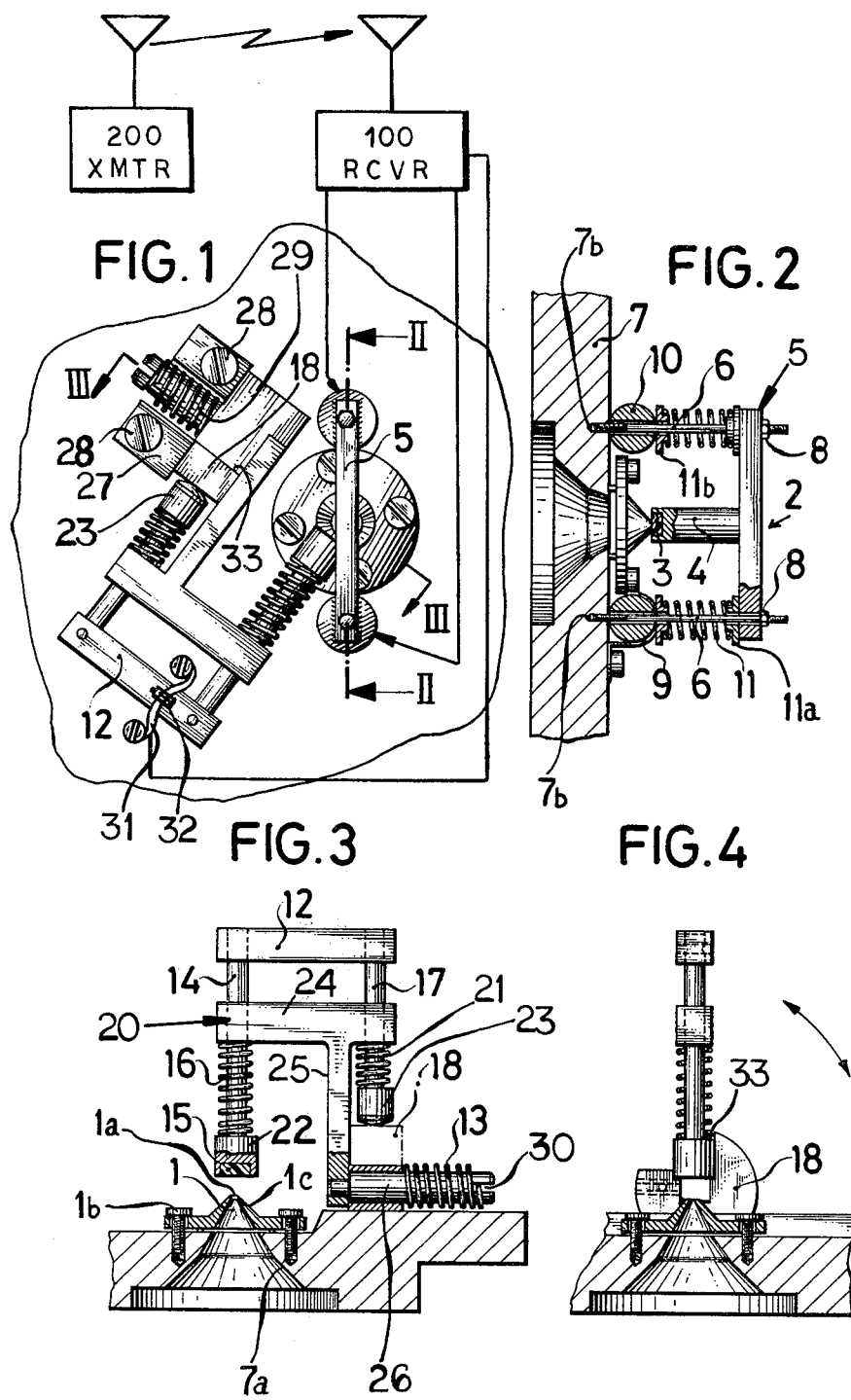

METHOD OF AND APPARATUS FOR REMOTELY CONTROLLING ORIFICE-OPENING AND ORIFICE-CLOSING OPERATIONS

FIELD OF THE INVENTION

Our present invention relates to a method of and to an apparatus for the remote control of blocking and unblocking operations for openings such as intake or discharge nozzle orifices. More particularly, the invention relates to a device which can be activated from a remote location and which will reliably unblock an orifice but which also will allow, again under remote control, the subsequent blocking of the orifice.

BACKGROUND OF THE INVENTION

It is frequently desirable to remotely actuate or trigger the blocking and unblocking of an orifice, or vice versa, for any of a large number of purposes. For example, it may be desirable to allow, for a certain period of time, a fluid from one region to pass into another, e.g. in the case of an activation fluid such as a battery electrolyte and an activation system such as a primary battery.

In another case, for instance, it is desirable to unblock an air intake orifice for the collection of air samples by a cryocollector, e.g. as described in the concurrently filed copending application entitled "Cryogenic Pump and Air Sample".

The term "remote actuation" is used herein to refer to the operation of the closure for the orifice from any distance, e.g. through signals transmitted by any electromagnetic radiation system, e.g. radiowaves, microwaves or laser, between a transmitting station and the remote location of the opening which is to be selectively blocked and unblocked. This opening can be located in a satellite orbiting the earth or in a ship travelling through space, or in a balloon-supported instrument, etc. Naturally, the signal transmission may be effected by other means as well. It also refers to altitude-triggered operations using an altimeter on a vehicle, etc.

In all remote operation systems, the principal desire is for reliability, especially since the remote location is generally inaccessible for maintenance operations. The device should, therefore, remain activatable over long periods and even after long periods of standing, should be capable of being actuated with a given response.

In prior-art systems for selectively blocking and unblocking openings or orifices, motor-driven members have been employed. Such systems are expensive and heavy, while being of only limited reliability. In fact, motor-driven valves for closures require comparatively frequent maintenance and inspection.

OBJECTS OF THE INVENTION

It is the principal object of the invention to provide a method of selectively blocking and unblocking an opening whereby disadvantages of prior-art systems are obviated.

Another object of this invention is to provide a device for selectively opening and closing an orifice which has greater reliability than earlier systems, is of especially light weight and can be of low cost.

It is also an object of the present invention to provide a closure device which can be remotely actuated and is especially effective for use in the opening and closing of an orifice of an air sampler, especially of the type described in the aforementioned copending application.

SUMMARY OF THE INVENTION

These objects and others which will become apparent hereinafter are attained, in accordance with the present invention, in a method for the remote control opening of an aperture, especially a nozzle orifice which comprises a remotely ignitable chemical propellent, e.g. in the form of an explosive squib, which is fired to separate a retainer of a spring-loaded orifice-closure element from a support, thereby unlocking the orifice and, upon removal of the blocking member, positioning another spring-loaded valve closure member in line with the orifice and firing a further squib to permit spring-loading means to close this orifice.

The term "squib" is used herein to refer to any remotely triggerable chemically reactive body capable of generating the energy, force or chemical conditions, generally in an explosive manner, for destroying a retaining member which permits spring force to be effective in the manner described. It especially can include guillotine devices (Seilkappvorrichtung) of the SKV type, i.e. a guillotine device which generally consists of a cylinder with a bore through which the wire or rod passes and which has a blade to cut the latter when the charge is fired.

We have found that the system described above is especially effective for unblocking and thereafter blocking nozzle orifices, especially for cryocollectors adapted to sample air.

For example, the system of the invention has been found to be capable of maintaining a leak-free closure of the orifice and, after reclosing, maintaining this vacuum-tight state so that the leak rate will be less than $10^{-7}$ mbars·l·s$^{-1}$. This is especially the case when the spring-loaded valve closure element has a silicone sealing body.

Another advantage of the system of the present invention is that the orifice has a significant obstruction-free region ahead of it. The system permits a remote command, in the form of an electrical signal, to trigger the opening and closing of the orifice rapidly and the system is reliable in all states so that, for example, when the device is trucked distances about a 1000 km, vibration of the like will not break the closure. Obviously, the overall weight of the device must be small if it is not to limit the allowable weight of the collecting apparatus. Finally, the arrangement of the invention can be fired by simple remote command.

According to the invention, the second closure element is displaceable, e.g. by spring means, between a position in which it is laterally offset from the orifice during its inoperative state, but swings automatically into position in line with the orifice once the original closure has been dislodged. In this position, the closure element is held back by a remotely triggerable chemical propellent or explosive.

According to yet another feature of the invention, the closure element which is dislodged to unlock the orifice, is carried by a bar held by a pair of tension members to a support provided with the orifice while respective springs on these elements urge the closure away from the orifice. The tension elements are severed by squibs which are fired from remote locations. The second closure element meanwhile lies in an inoperative position and upon release of the first is swung into a position into which it is aligned with the orifice, being retracted therefrom by a remotely triggerable device against the force of a spring means. When this latter device is fired, of course, the freshly positioned closure element can be swung into its operative position by spring means and can be held in this position by a stop (abutment) or indexing means.

According to a feature of the invention, the primary closure element forms part of a T-shape member, the free ends of the cross bars of which are retained against the support by respective tie rods while springs coaxial with these tie rods urge the cross bar away from the support. The tie rods are provided with squibs which, upon firing, sever the rods and allow the springs to propel the T-shaped member away from the orifice. The tie rods are advantageously composed of aluminum.

The secondary closure element is spring-loaded in the direction of the orifice on a frame and is coupled with a cam follower which bears against a spring to hold the closure element away from the orifice until the frame swings into its erect position with respect to the latter. In this position the cam follower can also form a detent locking the frame in place while the follower is released to allow the springs to drive the secondary closure element against the orifice. The frame may be held in its recumbent position by a stainless steel wire provided with another squib which can be fired to sever the wire and release the frame.

The device of the invention for opening and closing a nozzle orifice has been found to be particularly effective when used in association with the gas inlet opening of a cryocollector as described in the aforementioned copending application since it can be operated from a remote location without particular difficulty.

The energy of actuation is, of course, the force stored in the respective springs together with the chemical propellant which is fired, for example, in the form of hermitally gas-tight cap devices. By comparison with conventional opening and closing systems using electrical motors the weight can be sharply reduced by about 90% since the motors, batteries and the like are eliminated or rendered insignificant while heavy motor windings need not be provided. The remote actuation only requires two different electric signals, each of which is converted into an inclination pulse.

The system of the invention allows a sharp opening and closing of an orifice for gas inlet or outlet in an interval of several milliseconds while conventional motorized drives usually require several seconds.

Furthermore, the device of the invention ensures highly effective sealing before opening and after closing of the orifice since the sealing elements are pressed directly against the orifice by prestressed spring members and the pressing force need not overcome any significant friction. The rate with which the pressing force becomes effective is limited only by the efficiency of destruction by the cap and thus the rate of the firing of the cap, e.g. cutting the wire, releases the potential energy of the prestressed spring force-storing means. Since the pressing forces are elastic in nature, the seal is maintained with variation in temperature and in spite of differing thermal coefficients of expansion and contraction.

When the orifice is opened or unblocked, in accordance with the invention, undisturbed infeed and discharge of fluid is permitted without any material obstruction on the side of the orifice at which the device is provided since the secondary closure element can be sufficiently spaced from the orifice as not to represent an obstruction in the recumbent position of the frame. The undisturbed flow of liquid through the orifice is especially important for a contamination-free sampling of flowing media, e.g. for analysis of flowing cases or other fluids.

In summary, therefore, the system of the invention enables an apparatus of significantly smaller size and weight than conventional motorized valves, which is more simply actuated from remote locations by electronic means and with less danger of contamination of flow to be provided for selectively blocking and unblocking an orifice.

BRIEF DESCRIPTION OF THE DRAWING

The above and other objects, features and advantages of the present invention will become more readily apparent from the following description, reference being made to the accompanying drawing in which:

FIG. 1 is an elevational view of a device embodying the invention;

FIG. 2 is a cross-sectional view taken along the line II—II of FIG. 1;

FIG. 3 is a cross-sectional view taken along the sectional plane III—III of FIG. 1, but with the frame of the secondary closure element in its erect position; and FIG. 4 is a cross-sectional view perpendicular to the vies of FIG. 3 in the erect position of the frame.

SPECIFIC DESCRIPTION

In the drawing we have shown a closure device for an orifice 1a of an inlet nozzle 1 of a cryocollector or the like for sampling cases, although the same system can be employed for any apparatus in which it is desired to block an opening, unblock the opening by remote control and thereafter block the opening again.

In the embodiment shown, the support 7 is a flange and is formed with a passage 7a over which the nozzle plate 1 is mounted, being held by angularly equispaced screws 1b. The orifice 1a is formed at the tip of a frustoconical boss 1c.

Initially, the orifice 1a is held blocked by a silicone disk 3 seated in an end of a rod or plunger 4 which is fixed to a cross bar 2 so as to form a T herewith. The T-shaped element forms a yoke 5 whose free ends are held by rods 6 to the flange or support 7.

More particularly, the two relatively long aluminum rods 6 are threaded bores 7b of the flange on diametrically opposite sides of the nozzle 1.

The opposite ends of the rods 6 are also threaded and receive nuts 8 after passing through bores 5a in the yoke 5.

The rods 6 are surrounded by prestressed springs 11 which bear via spring-seat washers 11a against the yoke and also rest against washers 11b which rest against squibs 9 and 10 forming electrically firable charges capable of severing the aluminum rods 6. The charges 9 and 10 can be of the type SKV 2/1 manufactured by DYNAMIT NOBEL AG, i.e. so-called Seilkappvorrichtung (guillotine) for remote actuation, the device may be provided with a receiver represented at 100 delivering signals to the squibs and transmitted from a remote location by a transmitter 200.

Upon firing of the squibs 9, 10, the springs 11 propel the yoke 5 and the closure element 4 away from the orifice and free the latter.

The device of the invention also comprises a secondary closure element which has been represented in its recumbent position in FIG. 1 but which can swing to the erect position shown in FIGS. 3 and 4. This device comprises a connecting member 12 bridging a pair of rods 14 and 17 which are slideably guided in a T-shaped frame 20. Respective coil springs 16 and 21 urge the heads 22 and 23 of these rods away from the cross bar 24 of the T-shaped frame.

The shank 25 of this frame is connected to a pin 26 which is journaled in a block 27 held onto the flange 7 by a pair of screws 28. One end of a torsion spring 29 is anchored to this block while the other end is fixed in a slot 30 of the pin 26 which rotates with the shank 25 and hence with the frame 20.

The torsion spring 29 is under angular prestress and tends to swing the frame upwardly, i.e. in a counter-clockwise position as viewed in FIG. 4. However, it is held in its recumbent position by a stainless steel wire 31 which has another squib 32 activated by the receiver 100.

In the recumbent position, the head 23 (see FIG. 1) bears upon an arcuate cam 18 which maintains the springs 16 and 21 stressed. When the squib 32 is fired, the wire 31 is severed and the frame 20 springs upwardly until the cam follower head 23 drops behind the ledge 33 of the cam 18, thereby releasing the cam follower and permitting the heads 22 and 23 to spring downwardly and bring the silicone sealing disk 50 into engagement with the orifice. Head 23 thus cooperates with the ledge 33 to index the frame in the orifice-closing position. In this position the frame 20 and bar 12 lie in a plane perpendicular to the flange and constitute an axial plance of the orifice.

We claim:

1. An unblocking and blocking device comprising:
    a support formed with an opening adapted to be unblocked and blocked by remote control:
    primary closure means blocking said opening and including:
        a primary closure element bearing on said support around said opening,
        first spring means bearing on said primary element and biasing same away from said support,
        at least one rod connected to said primary element and retaining same against said support, and
        a first ignitable means cooperating with said rod and firable by remote control to sever said rod and release said primary element from said support whereby said first spring means drives said primary element away from said opening, and
    secondary closure means including:
        a secondary closure element spaced from said opening,
        second spring means bearing upon said secondary element for urging same into alignment with said opening,
        remotely controlled second ignitable means retaining said secondary element out of alignment with said opening until fired, and
        a third spring means acting upon said secondary element for displacing same against said support around said opening to block the latter upon the firing of said second ignitable means.

2. The device defined in claim 1, further comprising indexing means for fixing said secondary element in alignment with said opening.

3. The device defined in claim 2 wherein said primary means comprises a T-shaped member formed with said primary element and having a cross bar, opposite ends of said cross bar being traversed by respective rods retaining said element against said support, said first spring means including respective first springs surrounding said rods and urging the cross bar away from said support.

4. The device defined in claim 2 wherein said secondary means including a T-shaped member swingable about an axis parallel to said support between a position wherein said secondary element is recumbent on said support and a position wherein said secondary element is aligned with said opening, said T-shaped member being provided with a cam follower retaining said secondary element away from said opening until said secondary element is aligned therewith, said cam follower riding on an arcuate cam and forming said indexing means for said secondary element.

5. The device defined in claim 4, further comprising a wire forming part of said second ignitable means for retaining said T-shaped member in the position in which said secondary element is recumbent.

* * * * *